United States Patent Office 3,795,564
Patented Mar. 5, 1974

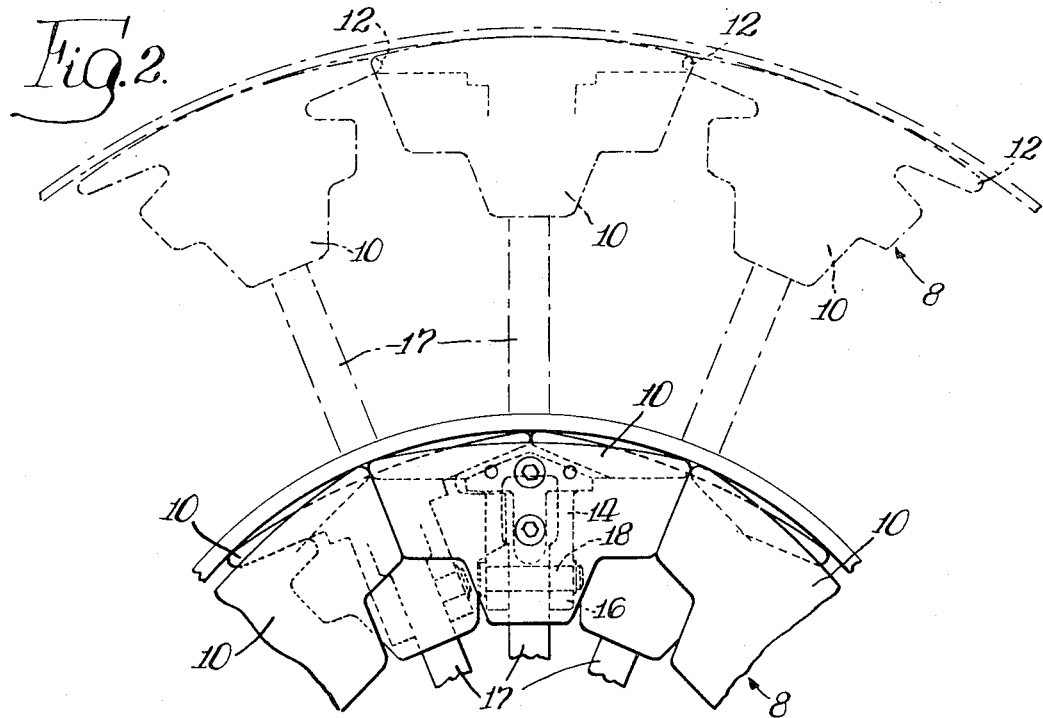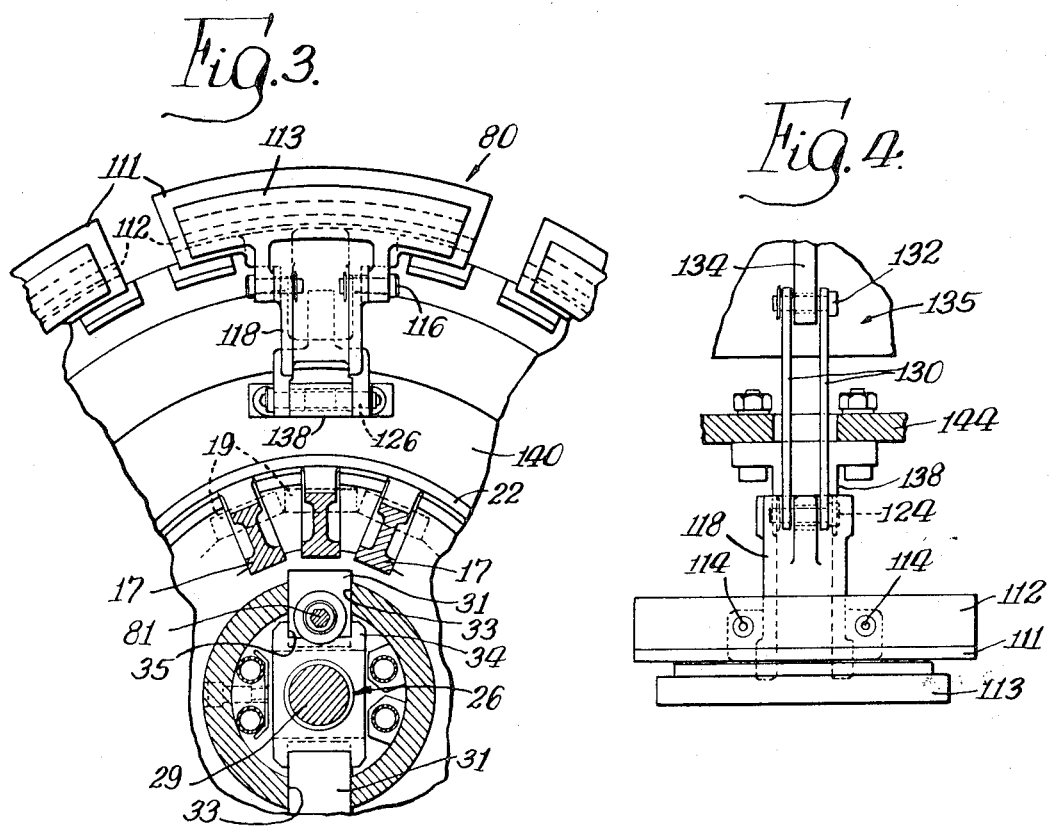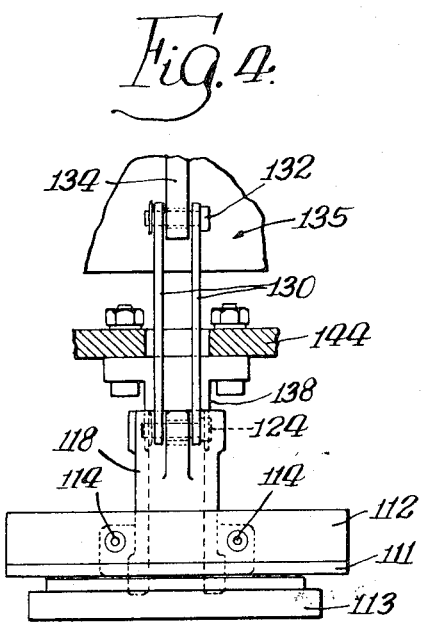

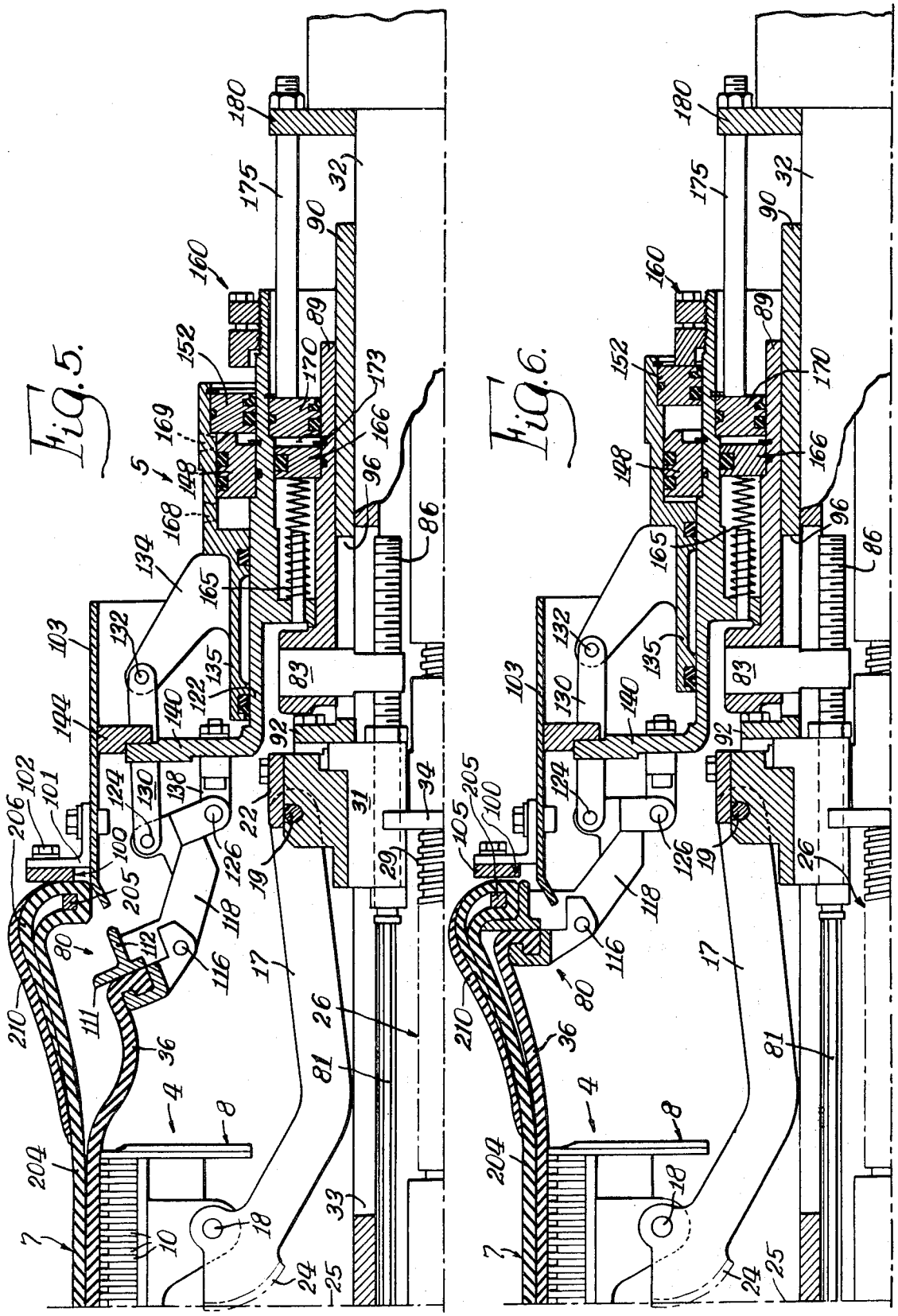

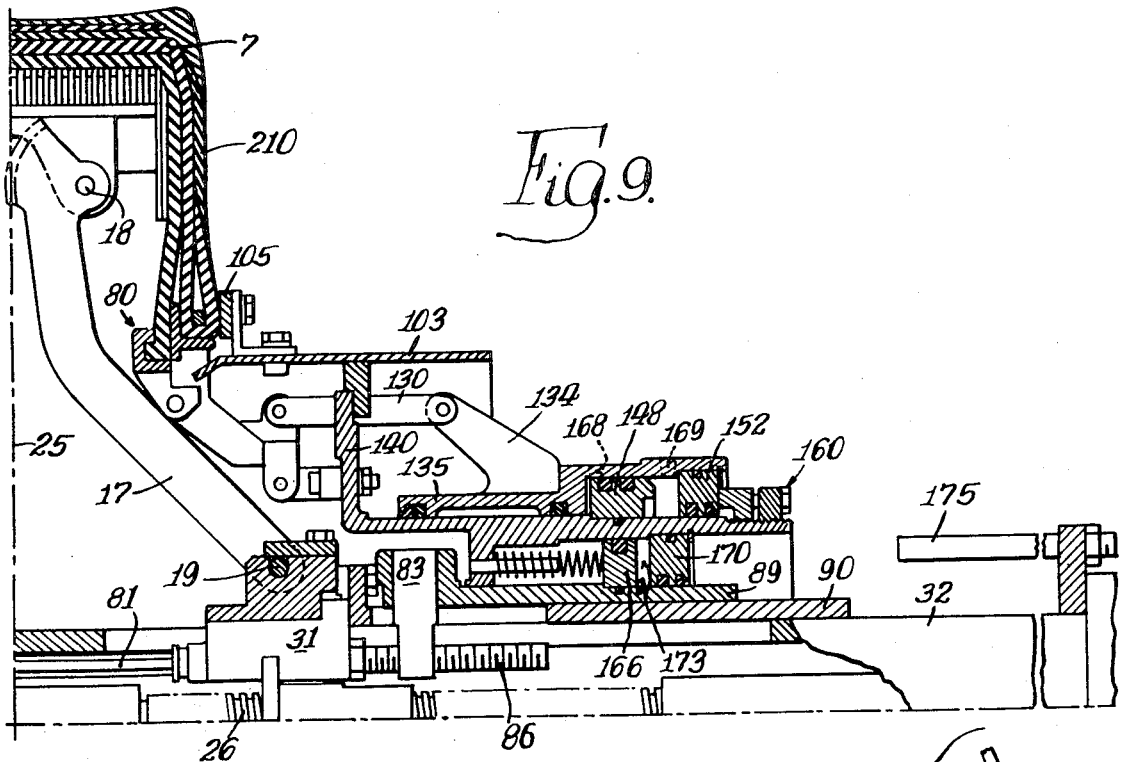
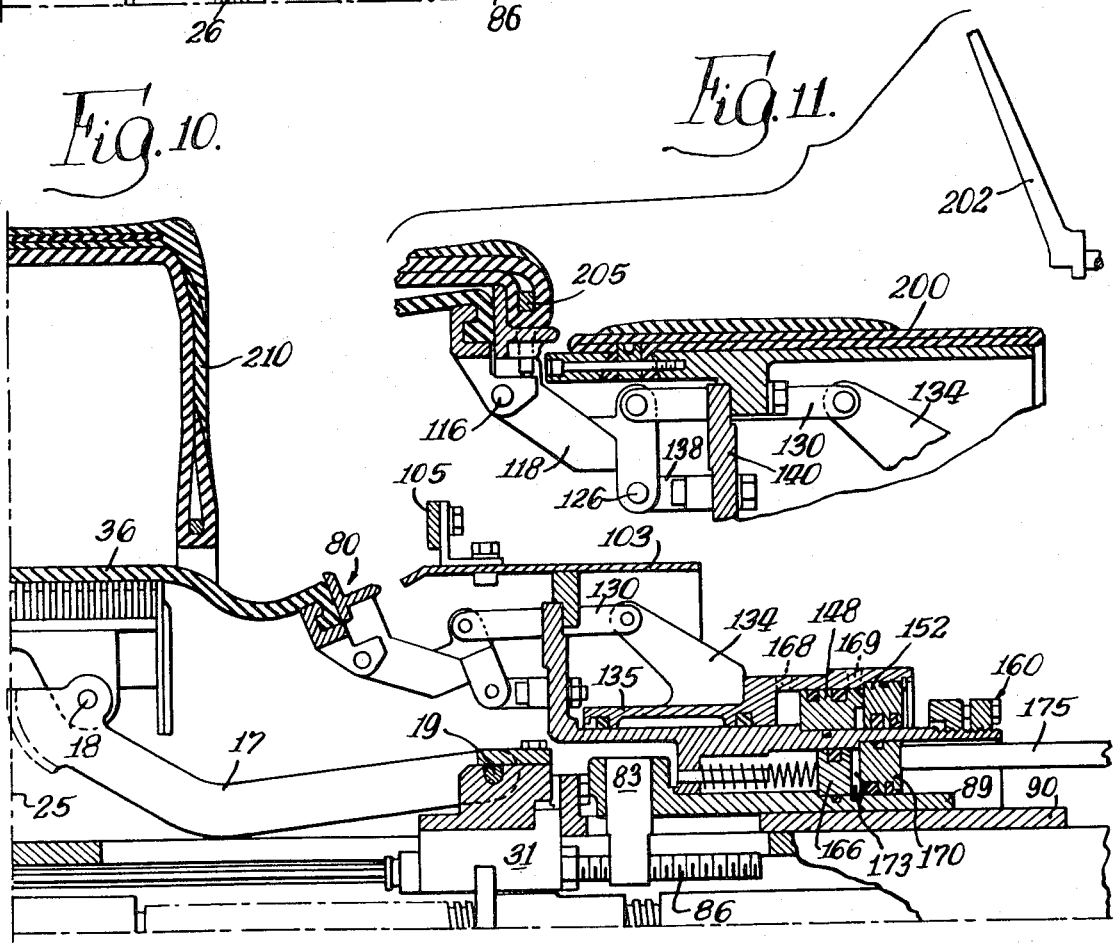

3,795,564
TIRE BUILDING APPARATUS
Edwin E. Mallory, Niles, Mich., assignor to National-Standard Company, Niles, Mich.
Filed Sept. 24, 1971, Ser. No. 183,440
Int. Cl. B29h *17/16, 17/26*
U.S. Cl. 156—417
17 Claims

ABSTRACT OF THE DISCLOSURE

A tire building apparatus embodying an expandable and contractable intermediate drum, inboard and outboard end drum assemblies at opposite ends of the intermediate drum for initially supporting loosely thereon a cylindrical tire carcass having tire beads embedded at opposite ends thereof, tire bead supporting and locating means at the inner ends of the end drums in an arrangement including first carrier means and in which the tire bead supporting and locating means may be positioned with respect to the first carrier means in equidistant axially spaced apart relation with respect to the transverse centerline of the intermediate drum, stop means providing for initial slipping engagement of the tire bead supporting and locating means with the tire carcass material at the tire beads to center the cylindrical tire carcass material and encased tire beads to center both radially and axially the tire carcass and the tire beads on the tire building apparatus, holding pin means for holding the tire carcass material and the tire beads in such centered position as that upon expansion of the intermediate drum the tire carcass material and tire beads remain in the aforesaid centered position and the tire carcass material is maintained under tension between the tire beads. A tire building machine having such additional features as the provision of preliminary tire carcass locating means at the inner end of the inboard drum for preliminarily positioning a tire carcass generally centrally on the apparatus, tapered shroud means at the outer end of the outboard end drum for facilitating position of a tire carcass, and resilient stop means associated with the outboard drum assembly for limiting inward movement of the intermediate drum.

BACKGROUND OF THE INVENTION

It is known prior to the present invention to provide tire building apparatus comprising an intermediate drum and end drums which in starting or initial positions thereof provide a substantially cylindrical surface for supporting tire carcass material in the form of a cylinder thereon. The intermediate drum may, for example, be of a construction embodying a plurality of circumferentially arranged deck segments each of which include a plurality of supporting members or blades extending in directions circumferentially of the drum, and which are in end-to-end interleaved relation between adjacent deck segments so that upon the outward radial displacement of the deck segments, the outer surfaces of the supporting members or blades define supporting surfaces of different radii. Thus, after disposition of tire carcass material around the intermediate drum with the end assemblies in their initial positions, the intermediate drum may be expanded to form the tire carcass material into substantially torus configuration approximating that of a completed tire for the application, for example, of breaker and tread components to the crown portion of the tire carcass. Alternatively, as is also known, breaker and tread components may be supported radially outwardly of the intermediate drum assembly so that upon radial expansion of the intermediate drum assembly the tire carcass material therearound is expanded and pressed against the breaker and tread components so supported. The supporting members or blades of the deck segments in the positions last noted provide a firm surface of desired peripheral extent supporting the tire carcass material enabling components such as breakers and tread components to be well stitched to the tire carcass.

A known tire building machine of the character noted has utility for building a tire carcass with tire beads of a given predetermined diameter over a range of axially spaced apart relationship with respect to each other.

THE INVENTION

The invention comprehends a tire building apparatus having an intermediate drum assembly and end drums at opposite ends of the intermediate drum assembly which provides for accurately positioning a tire carcass on a so-called second stage drum to form tire carcass material into torus shape or that approximating a completed tire in which all components of the formed tire carcass, such as the outer periphery of the formed tire carcass and the tire beads, are all in true concentric and axially spaced apart relation.

By way of example, the tire building apparatus of the present invention is well suited to serve, as noted, as a so-called second stage shaping drum in which a tire carcass is first formed of cylindrical configuration with tire beads wrapped in the outer end portions of the tire carcass material. Upon placing of such a preformed tire carcass upon the tire drum building apparatus of the present invention, such pre-formed carcass may be formed into torus configuration or that approximating the shape of a completed tire with the apparatus serving to function to dispose the outer periphery of the tire carcass in its expanded form in true concentric relation with respect to the longitudinal axis of the drum, and with the tire beads in equidistant axially spaced relation to the transverse centerline of the intermediate drum over a predetermined range of axially spaced apart relationship of the tire beads. In known so-called two-stage building systems the quality of the completed tire suffers because of inaccurate positioning of the pre-formed cylindrical carcass when placed on the second-stage apparatus.

It is an important feature of the invention to provide an extremely accurate location of a pre-formed tire carcass, as aforenoted, on the apparatus with the tire beads equidistant from the vertical transverse axis of the intermediate drum even if the carcass is initially mounted slightly off center on the tire building apparatus of the present invention. Further in the present invention, the pre-formed tire carcass material with the tire beads embedded thereon is maintained concentric about the axial centerline of the drum, and in forming of the carcass material and embedded tire beads into torus configuration or that approximating a completed tire and maintain such concentricity during final shaping of the tire carcass material.

The intermediate drum of the apparatus of the present invention is of known construction and provides an outer surface of desired peripheral extent concentric about the longitudinal axis for the shaping of the tire carcass material, and which together with the known expedient of maintaining the tire beads concentric about the longitudinal axis and with the tire beads in equidistant axially spaced relation with respect to the transverse center axis of the intermediate drum an extremely accurate tire may be constructed on a second-stage drum.

DESCRIPTION OF THE DRAWINGS

FIG. 2 is a vertical sectional view taken substantially along the line 2—2 of FIG. 1b looking in the direction indicated by the arrows;

FIG. 3 is a vertical sectional view taken substantially along the line 3—3 of FIG. 1b looking in the direction indicated by the arrows;

FIG. 4 is a plan view of the central portion of FIG. 3;

FIGS. 5 through 10 show the upper right hand quadrant of the apparatus shown in FIG. 1b illustrating the sequence or positions of the parts of both drum assemblies in fabricating a tire; and FIG. 11 shows another modification of the invention in which only the upper right hand quadrant of the apparatus is shown for building a side wall over tread tire construction.

DESCRIPTION OF A FIRST PREFERRED EMBODIMENT OF THE INVENTION

Figure 1A:
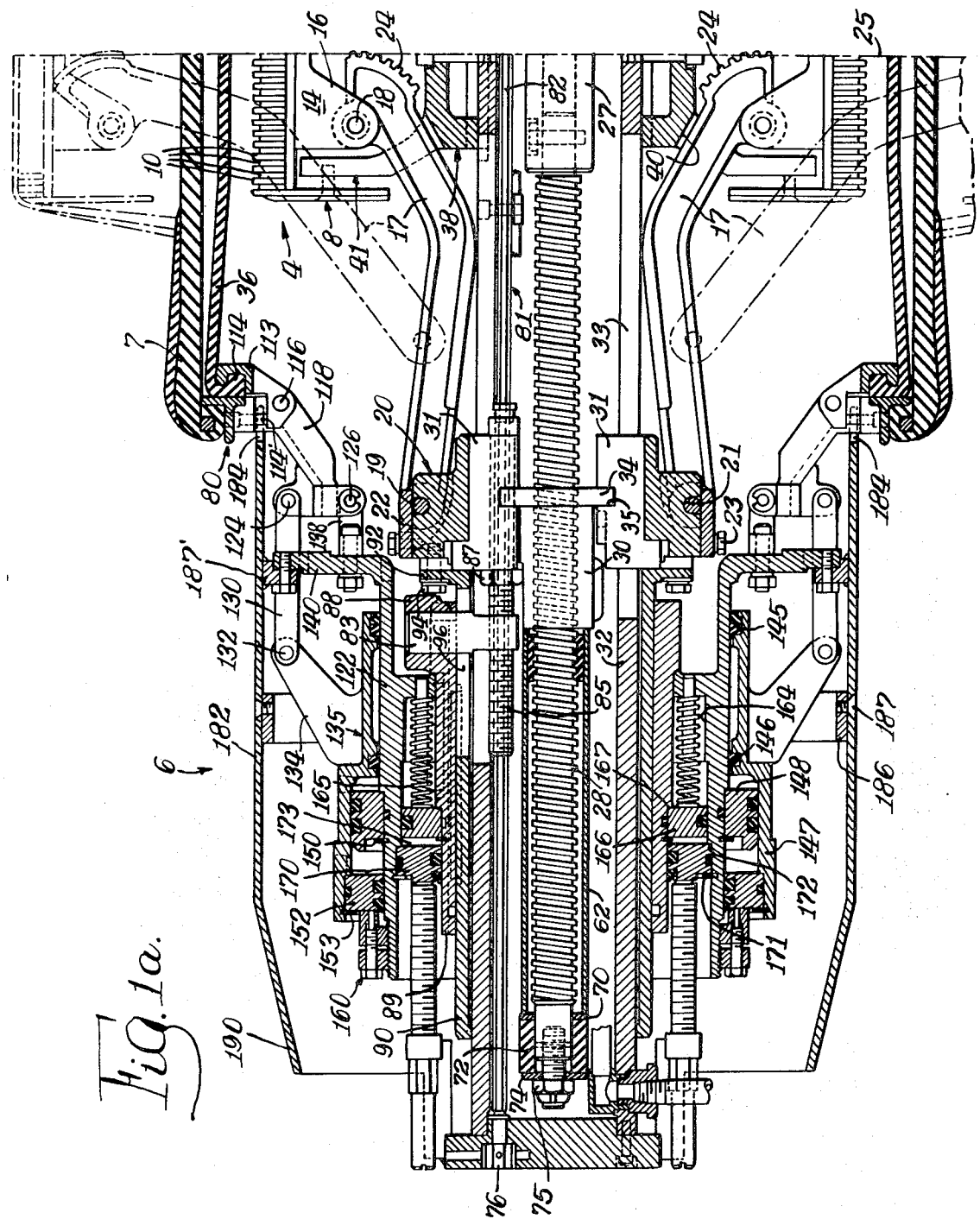
FIGS. 1a and 1b joined in end-to-end relation on the dotted centerline show a longitudinal sectional view of a tire building apparatus according to the present invention with the parts in position for supporting a previously formed tire carcass of radial type construction.
Figure 1B:
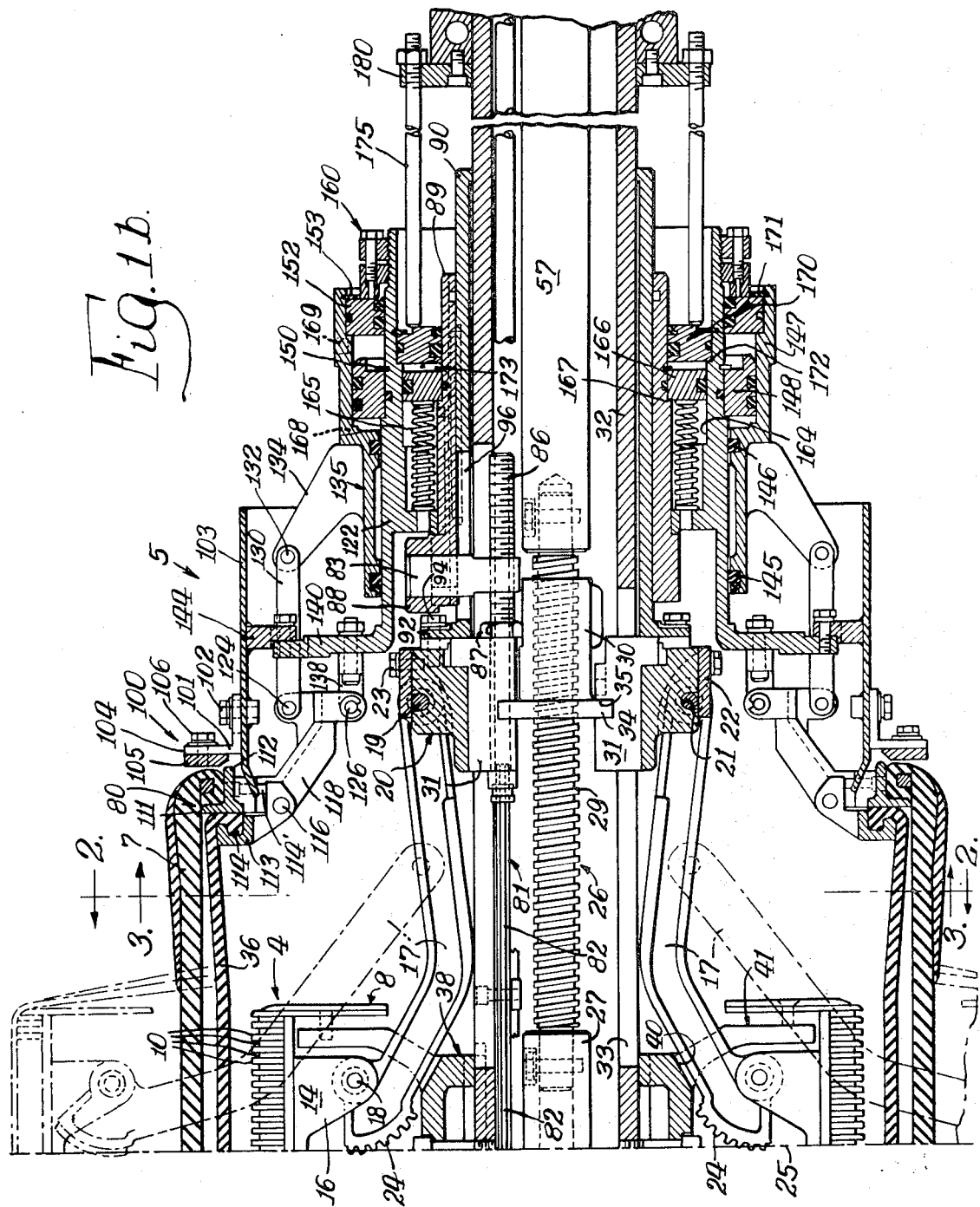

Referring now to FIGS. 1a and 1b of the drawings the tire building apparatus there shown comprises an intermediate expandable drum assembly 4 and inboard and outboard end drum assemblies 5 and 6 respectively.

The intemediate expandable drum assembly 4, as best seen in FIGS. 1a, 1b, is of a construction shown and described in the copending application of Emerson C. Bryant, Ser. No. 4,285, filed Jan. 2, 1970, now Pat No. 3,637,450, dated Jan. 25, 1972, and the copending application of Larry C. Frazier and Emerson C. Bryant, Ser. No. 47,522, filed June 18, 1970, now Pat. No. 3,684,621, dated Aug. 15, 1972, both of which applications and patents are assigned to the assignee of the present application, and to which reference may be had.

The drum assembly 4 as disclosed in the foregoing application and patents comprises a plurality of circumferentially arranged platforms or deck segments 8. Each deck segment may typically include a plurality of supporting members or blades 10 extending circumferentially of the drum 4 and spaced apart in side-by-side relation in which they are in end-to-end interleaved relation between adjacent drum sections 8. In the fully expanded position of the expandable drum assembly 4, as best seen in dot-dash lines in FIG. 2, the adjacent end portion 12 of the adjacent blades 10 preferably remain interleaved. Also as is known, the width of the deck segments 8 may be predetermined by the addition or subtraction of supporting members 10 preferably at the ends of the drum 4. Referring again to FIGS. 1a and 1b each deck segment 8 is formed with a bifurcated bracket 14 having radially inwardly extending opposed arm portions 16 between which the inner ends of pusher arms 17 are pivotally mounted as at 18. The pusher arms 17 lie in planes extending axially of the intermediate assembly 4, and at their outer ends are pivotally mounted, as at 19, in axially spaced apart pusher means, such as pusher rings 20.

As shown the pusher rings 20 are formed with transversely extending substantially annular sockets 21 receiving the pivot pins 19, which pivot pins are retained in the sockets by retaining members 22 secured to the pusher rings 20 by bolts 23. The pusher arms 17 adjacent their inner ends are provided with identical meshing gear teeth 24 on the transverse centerline 25 of the intermediate drum assembly 4 perpendicular to the axis of the pusher rings 20.

The foregoing bracket 14, pusher arms 17, pusher rings 20 and associated components, together with a hollow outer shaft 32 within which inner shaft means 26 is arranged, define, in part, intermediate drum expanding and contracting means. In the intermediate drum expanding and contracting means shown in the drawings, the inner shaft means 26 is formed with left and right hand threaded shaft sections 28 and 29 respectively, joined by collar 27 at their opposed inner ends for keying the two shafts together for conjoint rotation. Ball nuts 30 have threaded engagement with the threaded portion of each of the shafts 28 and 29, each of which carries diametrically opposed ball nut adapters 31 which extend through axially extending slots 33 disposed in diametrically opposed relation in the hollow shaft 32, with one such slot being provided for each of the ball nut adapters 31. The ball nut adapters 31 have the pusher ring means 20 secured thereto by end members 34 having, as seen in FIG. 3, cut-outs 35 within which the ends of the ball nut adapters 31 are received. Mounted centrally of the hollow shaft 32 is a guide block means 38 comprising a hub and sloted end flange members 41 at opposite ends of the hub of the guide block means. The guide block means 38 is provided with slots 40 which serve to guide or prevent circumferential movement of the adjacent outer portions of the pusher arms 17 in operation of the apparatus.

As before indicated FIGS. 1a and 1b show the position of the parts in the initial or starting position for forming, for example, a previously formed radial type tire cylindrical carcass 7 having tire beads embedded in opposite ends thereo mounted on an elastic drum sleeve 36 extending between the inner ends of drum assemblies 5 and 6 into torus configuration or that approximating the shape of a completed tire. In the initial position of the parts, the inner screw means 26 has been suitably rotated by drive shaft means 57 to dispose the pusher rings 20 to their axially outermost positions with respect to each other.

After placement of the tire carcass material 7 in position as noted in connection with FIGS. 1a and 1b, the inner shaft means 26 is rotated to effect conjoint axial inward movement of the pusher rings 20 toward each other and at the same rate in which the meshing engagement of the gear teeth 24 radially expand the intermediate drum assembly to a position for progressively forming the tire carcass material 7 and the drum sleeve 36 into torus configuration, and in the end positions thereof the tire carcass material 7 is in the approximate form of a completed tire, and at which the supporting members or blades 10 move radially and circumferentially relative to each other to provide a supporting surface for the intermediate drum assembly for the application of a breaker and tread cap as, for instance, by conventional stitching wheels or otherwise as aforedescribed. The expansion of the intermediate drum assembly may be to the maximum position as aforenoted, but if a tire of smaller diameter is desired it will be readily seen that the relative radial and circumferential movement of the supporting members 10 may be stopped at any desired radial position for forming cylindrical surfaces of different radii for a desired diameter of a tire.

It will be observed that the slots 40 of the guide block means 38 in the radially outwardly slotted end flange members 41 prevent circumferential movement of the guide arms 17 and add rigidity to the drum construction in a circumferential direction. The mesh of the gear teeth 24 in the position of the parts as shown in FIGS. 1a and 1b rigidly and accurately dispose the deck segments 8 with respect to each other so that the supporting members 10 define and act as a supporting surface of desired peripheral extent and symmetrical about the longitudinal axis of the drum for the tire carcass material. With the intermediate portion of the drum expanded to its outermost position, side walls may be placed upon opposite sides of the expanded tire carcass in a conventional manner.

In the specific illustrated form of the intermediate expandable drum 4 it should be noted that the gear teeth 24 are constantly in mesh, and as the deck segments 8 are consequently forced an equal distance radially outwardly on the axis 25 perpendicular to the axis of the pusher means 20, whereby the deck segments 8 remain substantially equidistant to the axis of the intermediate expandable drum 4. The gear teeth 24 are so developed so as to maintain the deck segments 8 in equidistant position resisting unequal roller pressures and also side pressures, such as are present in the application of a breaker, treadcap and/or side wall components as may occur in conventional stitching operations.

Also in the intermediate drum assembly shown in the drawings, the guide slots 40 in the guide block means 38 and arms 41 serve as torsion guiding members for the pusher arms 17 and through them for the deck segments when it is desired to effect rotation of the intermediate assembly as, for example, in the stitching of a breaker and tread cap to the outer center periphery of the tire carcass material 7. The inner portion of FIG. 2 shows in full lines the intermediate drum assembly 4 in collapsed position to which it is returned after completion of the assembly of components for a tire with the geometry being such that the intermediate drum 4 and components at the inner ends of the drum assemblies 5 and 6 collapse together with the elastic drum sleeve 36 to enable removal of the completed assembly of tire components from the outboard end of the drum upon completion or retraction of the parts at the inner ends of the drum assemblies 5 and 6 to the position shown in dotted lines in FIGS. 1a and 1b.

In the outboard drum assembly 6 resilient stop means is provided and comprises a hollow sleeve 62 extending around the threaded shaft 28, and at its inner end abuts the adjacent ball nut 30, and at its outer end abuts an inner plate 70. A resilient member 72, for example, of polyurethane material or the like is disposed between inner plate 70 and outer plate 74 to provide a resilient stop means for arresting or defining the outward end positions of the ball nuts 30 with respect to each other. The resilient stop assembly formed by the inner and outer plates 70 and 74 with the resilient material 72 therebetween is secured to the outer end of shaft 28 by a rotatable self-locking nut 75. Thus undue outward axial movement of the ball nuts 30 with respect to each other is arrested to prevent any undesirable collapsing of the intermediate drum assembly 4 and elastic drum sleeve 36. The position of the resilient stop means above described may be readily adjusted by means of the self-locking nut 75.

A predetermined axially spaced apart position of a pair of bead supporting and locator means 80 at the inner ends of the drum assemblies 5 and 6 is achieved by the provision of first carrier adjusting means 81 comprising hexagonal shaft 82, right and left hand threaded sleeves 85 and 86, and pins 83. Threaded sleeves 85 and 86 are journalled in ball nut adapters 31. End play is minimized by adjusting nuts 87 which are then pinned to the sleeves. Pins 83 have threaded engagement with sleeves 85 and 86 and at their opposite end fit bores in annular flange 88 of first carrier means 89.

Hex shaft 82 when rotated by hex member 76 simultaneously rotates threaded sleeves 85 and 86 by virtue of their internal hex bores. These effect equal movement inwardly and outwardly of pins 83 with respect to ball nut adapters 31. In turn first carrier means 89 are adjusted inwardly and outwardly with respect to quill means 90 which are fastened to ball nut adapters 31 by bolts 94. Thus the first carrier sleeve means 89 are mounted for adjustable relative axial sliding movement on quill sleeve means 90 to fixed adjusted position equidistant of the transverse centerline of intermediate drum 4 by reason of the first carrier sleeve means 89 being slotted as at 96 to provide for the aforementioned predetermined axial positioning of pins 83 in both end drum assemblies.

As the ball nuts 30, pusher rings 20 and quill sleeve means 90 are axially driven toward and away from the vertical centerline 25 of the drum to operate the expansion and contraction of the intermediate drum assembly 4, the quill means 90 carry along with them the first carrier sleeve means 89. However, as noted by the use of right and left hand adjusting screws 85 and 86 the first carrier sleeve means 89 may be adjusted on the quill sleeve means 90. Thus it will be readily appreciated that by adjusting the first carrier sleeve means 89 axially outwardly on quill sleeve means 90 the effect will be to increase the head set dimension of the bead supporting and locating means 80 for the drum.

Referring now to the end drum assembly 5, as shown in FIG. 1b, it includes at its inner end a radially outward extending approximate carcass locater 100 comprising a right angle annular flange 101 secured by bolt means 102 to an outer annular housing member 103 for the end drum assembly. A bumper member 105 is secured to the radially outwardly extending arm 104 of the flange 101 by means of bolt means 106.

The bead supporting and locating means 80 comprise bead supporting members 111, bead seat members 112, brackets 118, arms 138, and links 130. Brackets 118 are supported by arms 138 at pins 126. Arms 138 are mounted on outwardly extending flanges 140 of second carrier member 122. Also mounted on flanges 140 are depending annular flanges 144 of annular housing member 103. Bead supporting members 111 and bead seat members 112 are fixedly attached to brackets 118. Elastic drum sleeve 36 has enlarged annular end flanges 114 which are gripped between bead supporting member 111 and anchor members 113. Anchor members 113 are pivotally connected to brackets 118 at pins 116 and tightened to grip flanges 114 of sleeve 36 by bolts 114'.

As actuating cylinder means 135 along with their extending brackets 134 are moved axially with respect to second carrier means 122, pins 132 move links 130 which by virtue of pins 124 rotate brackets 118 about pins 126. Stop means 160, which as shown are adjustable, limit the travel of cylinder means 135 so that the inner surfaces of 111 and 112 with respect to bumpers 105 are so disposed as to provide slipping engagement with the tire carcass material at the tire beads 205.

The actuating cylinder means 135 are mounted for relative movement with respect to the second carrier means 122 with wiper 145 and seal 146 being provided between the two. The actuating cylinders 135 as shown are each formed with a second cylinder portion 147 axially outwardly of the bracket 134 and enclose a first piston 148 keyed to the cylinder 122 as at 150, and a second piston 152 keyed as at 153, at the outer end of the second cylinder portion 147. Second carrier means 122 together with the first carrier means 89 define a second cylinder 164 within which theere is a first piston means 166 in abutment with a shoulder 167 of the first carrier sleeve means 89, and a second piston means 170 retained by key 171 in engagement with shoulder 172 of second carrier means 122. A coil spring 165 at one end abuts piston 166 and serves, when the drum is collapsed, to hold the inner end of second carrier sleeve means 122 in engagement with the outer surface of flange means 88 of first carrier sleeve means 89.

Suitable seals are provided for the several cylinders described to prevent escape or leakage of fluid from the cylinder. It will be noted that with respect to cylinders 147 there are provided, at opposite ends thereof, fluid pressure connections 168 and 169. Also, fluid pressure inlets (not shown) are provided to admit air into chamber 173 provided between pistoin means 166 and 160 in the cylinders 164.

Holding pin means 175 are disposed in engagement with the outer ends of piston means 170, and the holding pin means 175 at their outer ends are adjustably mounted in a bracket 180 secured to the sleeve 32. The holding pins 175, in effecting the foregoing bead set adjustment, are disengaged from the piston means 170. After adjusting the bead set the holding pin means are then lightly engaged with the piston means 180. The holding pin means 175 after engagement with the piston means 180 as last noted serve to keep the tire beads and therefore the tire carcass material centered until the intermediate section expands sufficiently to tighten the tire carcass material and thereafter the pins serve no function.

Referring now to FIG. 1a it will be seen that the outboard drum assembly comprises a supporting ring 182 which is of tubular construction and covers the aforedescribed similar components of the inboard drum shown in FIG. 1b. As will be seen in FIG. 1a the inner end of the supporting ring 182 has fingers 184 which extend axially inwardly when the adjacent bead supporting and locating means 80 are in retracted position. In the advanced position of the left hand tire bead supporting and locating means 80, portions of the latter fit into the slots between fingers 184 and serve as tire carcass stop means to prevent positioning of a tire carcass on the apparatus when the parts are not in proper position to receive a tire carcass. The tire support ring 182 is mounted on an annular carrier 186 by screws 187. The tire supporting ring is also connected to an annular member 187' fixed to member 140 of sleeve member 122 and moves with the carrier during the tire shaping operation. The outer end of support ring 182 has a shroud portion 190. The purpose of the shroud is to cover the flexible hoses and drum parts and protect the operator when the drum is being rotated. The shroud 190 is of smaller diameter on its outboard end to facilitate the loading and unloading of a green tire carcass on the drum as will be described below in the description concerning the operation of the machine.

OPERATION OF THE ABOVE FIRST DESCRIBED EMBODIMENT OF THE INVENTION

Referring now to FIG. 5 in the position of the parts there shown, the radial type cylindrical carcass 7 has an intermediate portion 204 and opposite end portions in which tire beads are encased in ply turn-up portions, one of which is shown at 205. Referring to FIGS. 1a and 1b, the tire carcass material 7, as last described, may be preformed on known tire building machines such as are commonly employed in building bias angle tires, and which tire carcass material upon removal from such a known machine may be placed in position on the apparatus of the present invention by axially passing it over the lead or shroud portion 190 of the outboard drum assembly 6 to the position shown in FIG. 5, at which the right hand end of the tire carcass material 7, as seen in the aforenoted figure, abuts carcass locater means 100 to generally center the tire carcass material on the apparatus. As shown in FIG. 5, the tire bead supporting and locating means 80 are in their retracted or inoperative positions to permit placement of the tire carcass material 7 on the apparatus of the invention as aforedescribed.

As previously noted the various components of the end drum assemblies 5 and 6 are adjusted as aforedescribed to truly align them in concentric relation and equidistant from the centerline 25 of the intermediate drum assembly. Referring again to FIG. 5 air under pressure is admitted through port 168 which effects movement of actuating cylinder means 135 to dispose the tire bead supporting and locating means 80 to their retracted or inoperative positions to lie inwardly of the outer periphery of the apparatus of the invention.

With the tire carcass material 7 positioned as noted, fluid under pressure is bled through port 168 and fluid under pressure is admitted through port 169 to effect axial outward movement of the actuating cylinder means 135 to engage the tire bead supporting and locating means 80 with the tire carcass material at the tire beads 205. As previously noted the inner surface of the flange 111 and the inner surface of flange 112 of the tire bead supporting and locating means 80 have a slip fit with the inner periphery of the tire carcass material at the tire bead and the inner surface of the tire material lying axially inwardly of the tire beads 205 so that just prior to the position of the parts as shown in FIG. 6 the tire carcass material may move axially and radially so that when the portions of the tire carcass material at the tire beads 205 are fully engaged by the tire bead supporting and locating means 80, the tire carcass material 7 is truly concentrically centered about the longitudinal axis of the apparatus and with the tire beads 205 are equidistant from the transverse centerline 25 of the intermediate drum assembly 4 and also radially concentric.

Figure 7:
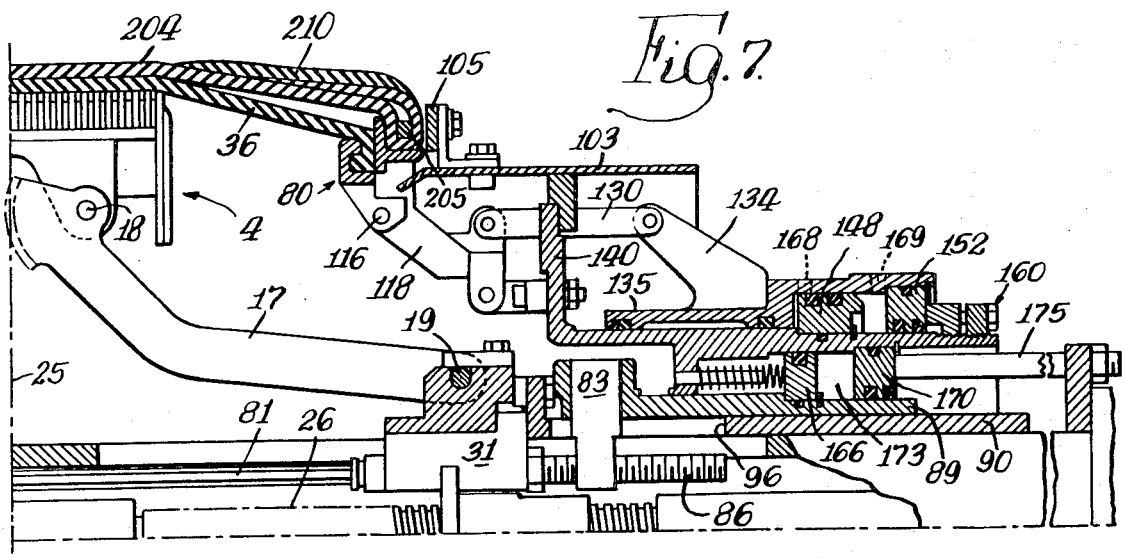
Figure 8:
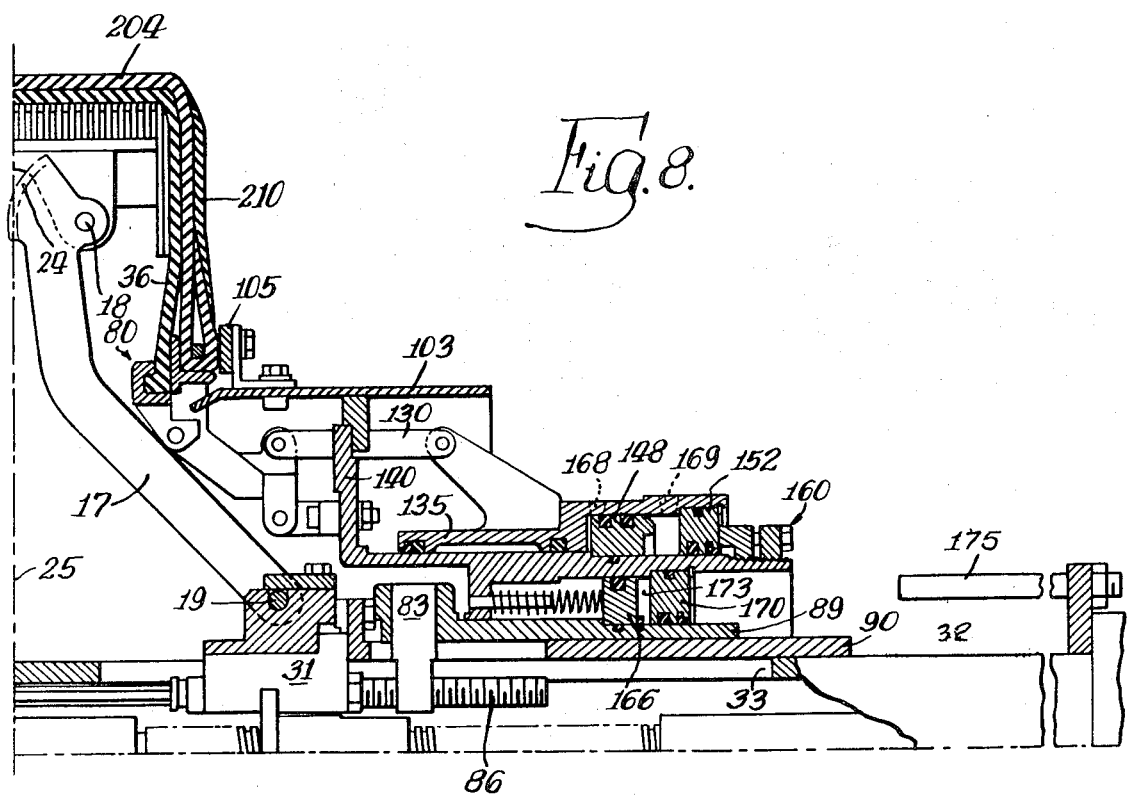

Turning now to FIG. 7 and with the tire carcass material in truly concentric position on the apparatus and with the tire beads fixed equidistant of the transverse centerline 25 of the intermediate drum assembly and at the beginning of the expansion of the intermediate drum 4, fluid under pressure is maintained through port 169 and, in addition, fluid under pressure is admitted into chamber 173 to tension the tire carcass material and maintaining the true axial centered position of the tire carcass material with the fluid under pressure through port 169 retaining the locating cylinder means 135 against adjustable stop means 160. Also as shown in FIG. 7 initial expansion of the intermediate drum has been effected and continues to effect formation of the tire carcass material into substantially torus configuration in the position of the parts as shown in FIG. 8. The fluid under pressure through port 169 is maintained and fluid under pressure is admitted through port 173 preferably of a value less than that admitted to port 169.

With the parts in position as shown in FIGS. 8 and 9 a breaker and tread cap may be applied to the crown portion of the formed tire carcass material 7 while maintaining the air pressure as last described.

As indicated in FIG. 8 sidewall components, one of which is shown at 210, have been applied to the side wall portions of the shaped tire carcass material 7 so that upon the application of a breaker and tread cap as shown in FIG. 9 a tread over side wall construction is provided.

Referring now to FIG. 10, upon completion of the shaping of the tire carcass material into substantially torus configuration and proper stitching, ports 169 and chamber 173 are under bleed while pressure is maintained through port 168 and the ports are retracted to their initial or starting position as shown in FIG. 5.

Any suitable fluid pressure distributing system (not described for simplification of the disclosure) may readily be provided within the skill of the art to effect the foregoing described admission and release of fluid under pressure to the cylinders and chambers as above described.

SECOND EMBODIMENT OF THE INVENTION AND DESCRIPTION OF OPERATION THEREOF

Referring to FIG. 11 there is shown a construction for builing a side wall over tread cap construction. The reference numerals applied to FIG. 11 are the same or similar to the parts previously described in connection with the embodiment of the invention of FIGS. 1 through 4.

In FIG. 11 an inflatable side wall applicator bag 200 is suitably mounted in known manner on the outer housing of the end drum assemblies such as, for example, shown in Pat. 3,490,908 dated Jan. 20, 1970 to E. E. Mallory and Larry C. Frazier. Side wall material such as shown in FIG. 8 is placed on the inflatable bags and after formation of the tire carcass material into torus configuration, as in the last noted figure, and after the breaker and tread are applied to the crown of the tire, the bags 200 are inflated and the pushers 202 axially advanced toward each other in known manner to place and stitch the side wall material to the sides of a tire carcass.

All other aspects of the apparatus shown in FIG. 11 are the same as above described in connection with FIGS. 1a, 1b and 5 through 10.

The invention claimed is:

1. In a tire making apparatus having an intermediate expandable drum mounted on a longitudinally extending main shaft intermediate the ends thereof, end drum assemblies one at each end of said intermediate expandable drum assembly, said intermediate expandable drum and said end drum assemblies proviing for the initial loose support of tire carcass material of substantially cylindrical configuration having tire beads embedded at the opposite ends thereof substantially concentrically of the main shaft, axially movable intermediate drum and expanding means including sleeve means mounted on said main shaft for axial inward and outward movement thereon for moving said end drum assemblies toward and away from each other upon expansion and contraction of said intermediate drum, carrier means for said end drum assemblies associated with said sleeve means for movement axially therewith and axially relative thereto, the combination therewith of tire bead supporting and locating means associated with said carrier means and disposed at the inner ends of said end drum assemblies, said tire bead supporting and locating means having tire carcass engaging surfaces for engaging the tire carcass material to locate simultaneously the tire beads both axially and radially, actuating means associated with said carrier means for movement axially therewith and relative thereto and connected with said tire bead supporting and locating means to dispose said tire bead supporting and locating means upon relative axial inward movement of said actuating means with respect to said carrier means to an inoperative position at which said tire carcass engaging surfaces are out of engagement with said tire carcass material, and stop means connected with said carrier means adapted to be engaged by said actuating means upon movement thereof axially outwardly relative to said carrier means for positioning said tire bead supporting and locating means to an operative position at which the carcass supporting surfaces of said tire bead supporting and locating means are in slipping engagement with the tire carcass material axially and radially inwardly of the tire beads upon expansion of said intermediate drum from its contracted position to its expanded position.

2. The apparatus of claim 1 characterized by the provision of means for said actuating means to maintain the latter in engagement with the stop means upon expansion of said intermediate expandable drum and upon movement of said end drum assemblies toward each other to form said tire carcass material into substantially torus configuration.

3. The apparatus of claim 1 characterized by one of said end drum assemblies having preliminary tire carcass locating means for generally centrally locating said tire carcass on the apparatus.

4. The apparatus of claim 1 in which said stop means are axially adjustable on said carrier means.

5. In a tire making apparatus having an intermediate expandable drum mounted on a longitudinally extending main shaft intermediate the ends thereof and defined by a plurality of circumferentially arranged deck segments each comprising a plurality of peripherally extending supporting members disposed in spaced apart side-by-side relation with the supporting members of adjacent segments being disposed in interleaved relation for movement radially and circumferentially relative to each other, an inboard drum assembly at one end of said intermediate drum, an outboard drum assembly at the other end of said intermediate drum, said intermediate expandable drum and said inboard and outboard end drum assemblies providing for the initial loose support of tire carcass material of substantially cylindrical configuration having tire beads embedded at the opposite ends thereof substantially concentrically of the main shaft, axially movable intermediate drum expanding and contracting means including sleeve means mounted on said main shaft for axial inward and outward movement thereon for moving said inboard and outboard drum assemblies toward and away from each other upon expansion and contraction of said intermediate expandable drum, the combination therewith of first carrier means axially adjustably mounted on said sleeve means, second carrier means mounted on said first carrier means for movement axially therewith and axially relative thereto, tire bead supporting and locating means associated with said second carrier means and disposed at the inner ends of said inboard and outboard end drum assemblies, said tire bead supporting and locating means having tire carcass engaging surfaces for engaging the tire carcass material to locate simultaneously the tire beads both axially and radially, actuating means associated with said second carrier means for movement axially therewith and relative thereto and connected with said tire bead supporting and locating means upon relative axial inward movement of said actuating means with respect to said carrier means to an inoperative position at which said tire carcass engaging surfaces are out of engagement with said tire carcass material, and stop means connected with said second carrier means adapted to being engaged by said actuating means upon movement thereof axially outwardly relative to said second carrier means for positioning said tire bead supporting and locating means to an operative position at which the tire carcass supporting surfaces of said tire bead supporting and locating means are in slipping engagement with the tire carcass material axially and radially inwardly of the tire beads upon expansion of said intermediate drum from its contracted position to its expanded position.

6. The apparatus of claim 5 characterized by the provision of means for said actuating means to maintain the latter in engagement with the stop means upon expansion of the intermediate expandable drum and upon movement of the end drum assemblies toward each other to form said tire carcass material into substantially torus configuration.

7. The apparatus of claim 6 characterized by the provision of first carrier adjusting means for said first carrier means for simultaneously adjustably fixing the axial positions of said first carrier means on said sleeve means in axially spaced apart relationship equidistant of the transfer center line of said intermediate expandable drum.

8. The apparatus of claim 7 characterized by the provision of means for said second carrier means for maintaining tire carcass material between the tire beads under tension during expansion of said intermediate drum.

9. The apparatus of claim 7 in which said first carrier adjusting means includes pin engaging means for engagement with one end of pin means extending radially outwardly through axially extending slots in said sleeve means and engaged at their outer ends in said first carrier means.

10. The apparatus of claim 5 in which a first cylinder is provided between said first and second carrier means, first piston means in said first cylinder means, and means for admitting fluid under pressure into said first cylinder means to prevent axial inward movement of said second carrier means in the initial expansion of said intermediate drum assembly.

11. The apparatus of claim 10 in which a second cylinder is provided between said second carrier means and said locating means, second piston means in said second cylinder means, and means for admitting fluid under pressure into said second cylinder means to move said actuating means axially to and from with respect to said second carrier means.

12. The combination of claim 5 characterized by the provision of an elastic sleeve encasing said intermediate drum assembly, and anchor means associated with said tire bead supporting and locating means for anchoring opposite ends of said elastic sleeve.

13. The apparatus of claim 5 characterized by the provision of preliminary tire carcass locating means at the inner end of the inboard drum assembly.

14. The apparatus of claim 5 characterized by said outboard drum having an outer encasing sleeve.

15. The apparatus of claim 15 characterized by the outer end of said outboard drum assembly having a tapered shroud portion with the end of small diameter being at the outer end of said outboard drum.

16. The apparatus of claim 5 characterized by the provision of resilent stop means associated with said intermediate drum expanding and contracting means for limiting axial outward movement of said intermediate drum expanding and contracting means to limit the radial outward movement of said deck segments.

17. The apparatus of claim 5 characterized by said stop means being axially adjustable on said second carrier means.

References Cited
UNITED STATES PATENTS

| | | | |
|---|---|---|---|
| 3,684,621 | 8/1972 | Frazier et al. | 156—415 |
| 3,674,604 | 7/1972 | Gazuit | 156—417 |
| 3,560,302 | 2/1971 | Missioux | 156—415 |
| 3,188,260 | 6/1965 | Nebout | 156—415 |
| 3,560,301 | 2/1971 | Cantarutti | 156—415 |

CLIFTON B. COSBY, Primary Examiner

U.S. Cl. X.R.

156—128 I, 135, 398, 420

UNITED STATES PATENT OFFICE
CERTIFICATE OF CORRECTION

Patent No. 3,795,564            Dated March 5, 1974

Inventor(s) Edwin E. Mallory

It is certified that error appears in the above-identified patent and that said Letters Patent are hereby corrected as shown below:

Column 9, line 12, change proviing to providing.

Column 10, line 48, change relationship to relation.

Column 10, line 71, change from to fro.

Column 11, line 8, change 15 to 5.

Signed and sealed this 16th day of July 1974.

(SEAL)
Attest:

McCOY M. GIBSON, JR.            C. MARSHALL DANN
Attesting Officer                Commissioner of Patents